United States Patent
Shambaugh (10) Patent No.: US 11,313,052 B2
(45) Date of Patent: Apr. 26, 2022

(54) MELT BLOWING APPARATUS AND METHOD

(71) Applicant: The Board of Regents of the University of Oklahoma, Norman, OK (US)

(72) Inventor: Robert L. Shambaugh, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 277 days.

(21) Appl. No.: 15/752,787

(22) PCT Filed: Aug. 15, 2016

(86) PCT No.: PCT/US2016/047022
§ 371 (c)(1),
(2) Date: Feb. 14, 2018

(87) PCT Pub. No.: WO2017/031053
PCT Pub. Date: Feb. 23, 2017

(65) Prior Publication Data
US 2018/0237954 A1    Aug. 23, 2018

Related U.S. Application Data

(60) Provisional application No. 62/205,406, filed on Aug. 14, 2015.

(51) Int. Cl.
*D01D 5/098*    (2006.01)
*B29C 48/05*    (2019.01)
(Continued)

(52) U.S. Cl.
CPC ....... *D01D 5/0985* (2013.01); *B29C 48/0018* (2019.02); *B29C 48/05* (2019.02);
(Continued)

(58) Field of Classification Search
CPC ............... B29C 48/05; B29C 48/0018; B29C 2791/007; D01D 5/0985; D01D 5/08; D01D 4/025; D01D 1/09; D04H 1/565
See application file for complete search history.

(56) References Cited

U.S. PATENT DOCUMENTS 2,526,775 A * 10/1950 Slayter ................. D01D 5/08
65/478
3,849,241 A    11/1974 Butin et al.
(Continued)

FOREIGN PATENT DOCUMENTS

WO    92/18677    10/1992
WO    2015/003869    1/2015

OTHER PUBLICATIONS

Shambaugh, R.L., "A Macroscopic View of the Melt Blowing Process for Producing Microfibers", *Ind. Eng. Chem. Res.*, 27, 2363, 1988.
(Continued)

*Primary Examiner* — Francisco W Tschen
*Assistant Examiner* — Elisa H Vera
(74) *Attorney, Agent, or Firm* — Dunlap Codding, P.C.

(57) ABSTRACT

A melt blowing apparatus and method includes a melt blowing die and at least one louver. The melt blowing die has a nosepiece comprising at least one aperture and at least one air slot adjacent the aperture. The at least one louver is movably positioned adjacent a face of the melt blowing die forming a zone through which can pass air and molten filaments from the air slots and nosepiece of the melt blowing die.

13 Claims, 8 Drawing Sheets

(51) Int. Cl.
  *B29C 48/00* (2019.01)
  *D04H 3/16* (2006.01)
  *D01D 4/02* (2006.01)
  *D04H 1/56* (2006.01)

(52) U.S. Cl.
  CPC ......... *D04H 3/16* (2013.01); *B29C 2791/007* (2013.01); *D01D 4/025* (2013.01); *D04H 1/565* (2013.01)

(56) References Cited

U.S. PATENT DOCUMENTS

| | | | | |
|---|---|---|---|---|
| 4,060,355 | A | * | 11/1977 | Walz .................. D01D 5/0985 425/7 |
| 4,380,570 | A | | 4/1983 | Schwarz |
| 4,820,459 | A | * | 4/1989 | Reifenhauser ....... D01D 5/0985 264/40.3 |
| 5,080,569 | A | * | 1/1992 | Gubernick ............ D01D 4/025 425/7 |
| 5,231,463 | A | | 7/1993 | Shambaugh |
| 5,405,559 | A | | 4/1995 | Shambaugh |
| 5,433,993 | A | | 7/1995 | Shambaugh |
| 5,523,033 | A | | 6/1996 | Shambaugh |
| 7,001,556 | B1 | | 2/2006 | Shambaugh |
| 7,198,745 | B2 | | 4/2007 | Newman et al. |
| 2002/0132546 | A1 | * | 9/2002 | Yamanaka ............... D04H 3/16 442/400 |
| 2004/0227277 | A1 | * | 11/2004 | Lin ........................ D04H 3/033 264/518 |
| 2006/0141085 | A1 | * | 6/2006 | Nickel .................. D01D 4/025 425/72.2 |
| 2013/0189892 | A1 | * | 7/2013 | Boscolo .................. D01D 5/14 442/337 |

OTHER PUBLICATIONS

Tate, B.D., and Shambaugh, R.L., "Modified Dual Rectangular Jets for Fiber Production", *Ind. Eng. Chem. Res.*, 1998, 37(9), 3772-3779.

Bresee, R.R. and Ko, W.C., "Fiber Formation During Melt Blowing", *International Nonwovens Journal*, Summer 2003, p. 21.

Tate, B.D., and Shambaugh, R.L., "Temperature Fields below Melt Blowing Dies of Various Geometries", *Ind. Eng. Chem. Res.*, 2004, 43(17), 5405-5410.

Shambaugh, B. R., Papavassiliou, D.V., and Shambaugh, R. L., "Next-Generation Modeling of Melt Blowing", *Ind. Eng. Chem. Res.*, 2011, 50(21), 12233-12245.

Shambaugh, B. R., Papavassiliou, D.V., and Shambaugh, R. L., "Modifying Air Fields to Improve Melt Blowing", *Ind. Eng. Chem. Res.*, 2012, 51, 3472-3483.

International Search Report and Written Opinion (PCT/US16/47022); dated Nov. 4, 2016.

* cited by examiner

MELT BLOWING APPARATUS AND METHOD

CROSS-REFERENCE TO RELATED APPLICATION

This application is a U.S. National Stage Application under 35 USC § 371 of International Application No. PCT/US16/47022, filed on Aug. 15, 2016, which claims priority to U.S. Provisional Application Ser. No. 62/205,406, filed on Aug. 14, 2015, the entire contents of each being hereby expressly incorporated herein by reference.

BACKGROUND

Melt blowing is a common process used in industry to produce nonwoven fibers. In melt blowing, heated gas streams impinge upon molten polymer filaments as the filaments emerge from a heated die. The force of the gas upon the molten filaments causes rapid attenuation of the filaments to fine diameter fibers. The attenuated fibers are cooled and captured upon a mesh screen placed some distance away from the die. The resulting mass of nonwoven fibers can be used as a filter, an absorbent medium, as reinforcement, or numerous other uses (Shambaugh 1988, Buntin et al. 1974, and Bresee and Ko 2003). The most common type of melt blowing die is the slot, or "Exxon" die (Tate and Shambaugh 1998). A significant portion of the costs involved with melt blowing are in the compressing, heating, and recycling of the air used in the process. Apparatus and methods that result in the use of less air would improve the economics of melt blowing.

BRIEF DESCRIPTION OF THE DRAWINGS

Several embodiments of the present disclosed inventive concepts are hereby illustrated in the appended drawings. It is to be noted, however, that the appended drawings only illustrate several embodiments and are therefore not intended to be considered limiting of the scope of the presently disclosed inventive concepts.

In the drawings, the following nomenclature is used:
c=louver chord width (mm) as defined in FIGS. 1 and 2,
e=louver thickness (mm) as defined in FIGS. 1 and 2,
f=louver spacing (mm) for parallel louvers (see FIG. 1),
$f_1$=louver spacing (mm) at top of louvers (see FIG. 2),
$f_2$=louver spacing (mm) at bottom of louvers (see FIG. 2),
x=Cartesian coordinate (mm) defined on FIGS. 1 and 2,
y=Cartesian coordinate direction (mm) perpendicular to the planes of FIGS. 1 and 2,
z=distance (mm) below the die as defined on FIGS. 1 and 2,
$z_1$=distance (mm) from the die face to the leading edge of the louvers in FIG. 2,
$z_2$=distance (mm) from the die face to the trailing edge of the louvers in FIG. 2,
α=louver angle in degrees, as defined in FIG. 2,
β=90−α (see FIG. 2)

DETAILED DESCRIPTION

The presently disclosed inventive concepts are directed in at least one embodiment to a melt blowing apparatus having a pair of louvers positioned below and within the air flow field of a melt blowing die of the apparatus. Experiments were performed in which air velocity measurements were taken in the presence of the louvers and in the absence of the louvers. In some experiments, the louvers were parallel with the airflow. In other experiments, the louvers were angled relative to the airflow, for example at angles up to 6 degrees.

Before further describing various embodiments of the presently disclosed inventive concepts in more detail by way of exemplary description, examples, and results, it is to be understood that the presently disclosed inventive concepts are not limited in application to the details as set forth in the following description. The description provided herein is intended for purposes of illustration only and is not intended to be construed in a limiting sense. The presently disclosed inventive concepts are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description. It is intended that all alternatives, substitutions, modifications and equivalents apparent to those having ordinary skill in the art are included within the scope of the presently disclosed inventive concepts as defined herein. All of the devices and methods of production and application and use thereof disclosed herein can be made and executed without undue experimentation in light of the present disclosure. Thus, while the presently disclosed inventive concepts have been described in terms of particular embodiments, it will be apparent to those of skill in the art that variations may be applied to the apparatus and/or methods described herein without departing from the spirit and scope of the inventive concepts.

All patents, published patent applications, and non-patent publications mentioned in the specification are indicative of the level of skill of those skilled in the art to which the presently disclosed inventive concepts pertain. All patents, published patent applications, and non-patent publications referenced in any portion of this application are herein expressly incorporated by reference in their entirety to the same extent as if each individual patent or publication was specifically and individually indicated to be incorporated by reference.

Unless otherwise defined herein, scientific and technical terms used in connection with the presently disclosed inventive concepts shall have the meanings that are commonly understood by those having ordinary skill in the art. Further, unless otherwise required by context, singular terms shall include pluralities and plural terms shall include the singular.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error for the device or the method described herein. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about" or "approximately", where used herein when referring to a measurable value such as an amount, a temporal duration, and the like, is meant to encompass, for example, variations of $\pm 20\%$ or $\pm 10\%$, or $\pm 5\%$, or $\pm 1\%$, or $\pm 0.1\%$ from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 1:
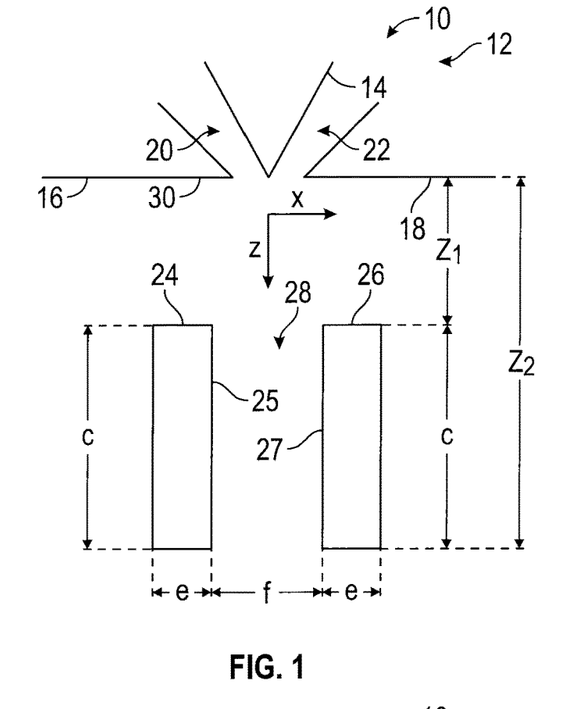
FIG. 1 depicts a cross-sectional schematic view of a melt blowing apparatus with a melt blowing die and louvers positioned below the die.
Figure 2:
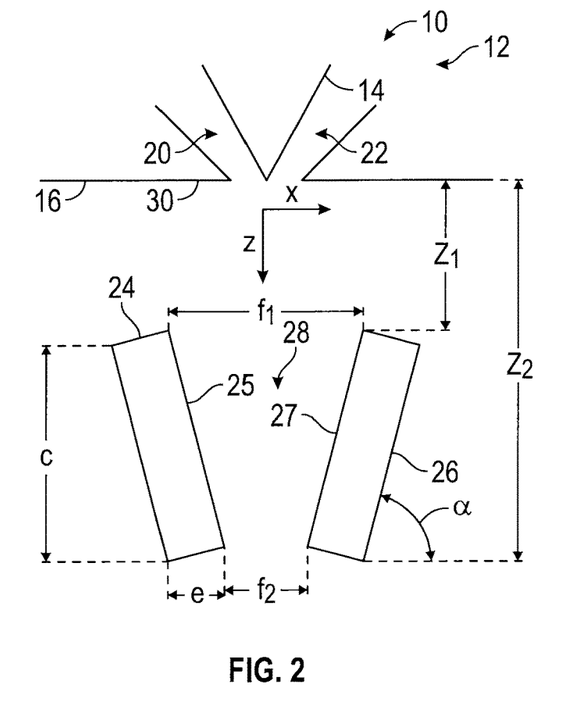
FIG. 2 depicts a cross-sectional schematic view of the melt blowing apparatus of FIG. 1 with the louvers at an angle to the direction of filament flow (Z).

Referring now to the drawings, in one embodiment typical of the presently disclosed inventive concepts, FIGS. 1 and 2 show a stylized cross-sectional view of a melt blowing apparatus represented by the general reference numeral 10. The melt blowing apparatus 10 includes a conventional melt-blowing die 12 constructed of a linear nosepiece 14 through which a heated polymer stream is extruded under pressure. Air plates 16 and 18 are located to the left and right, respectively, of the nosepiece 14. There is an air slot 20 between the nosepiece 14 and the air plate 16 and an air slot 22 between the nosepiece 14 and air plate 18. Hot air flows through the two air slots 20 and 22 and impacts molten polymer filaments as they emerge from the bottom of the nosepiece 14 (the orifices through which the polymer flows are not indicated in FIG. 1) causing attenuation of the polymer filaments into fibers. In non-limiting embodiments, the melt-blowing die 12 can have a length in a range of from several centimeters to a meter or more. FIGS. 1 and 2 show a vertical orientation of the melt-blowing die 12 wherein the air and polymer filaments move downwardly, however, the melt-blowing die 12 could also be oriented in a diagonal or horizontal direction. In FIG. 1 facing surfaces 25 and 27 of louvers 24 and 26, respectively, are equidistant (distance f) from each other, while in FIG. 2, the facing surfaces 25 and 27 are offset from each other so that a distance $f_1$ between the upper ends of louvers 24 and 26, is greater than a distance $f_2$ between the lower ends of louvers 24 and 26.

Figure 14A:
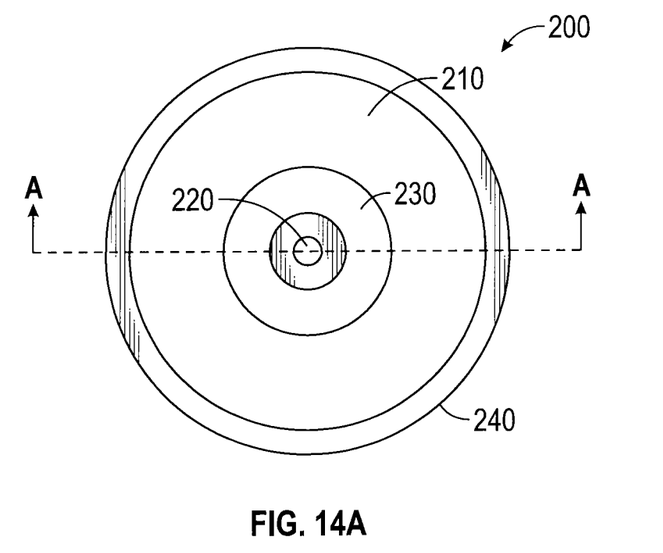
FIG. 14A is a bottom plan view of another embodiment of a melt blowing die system constructed in accordance with the presently disclosed inventive concepts.
Figure 14B:
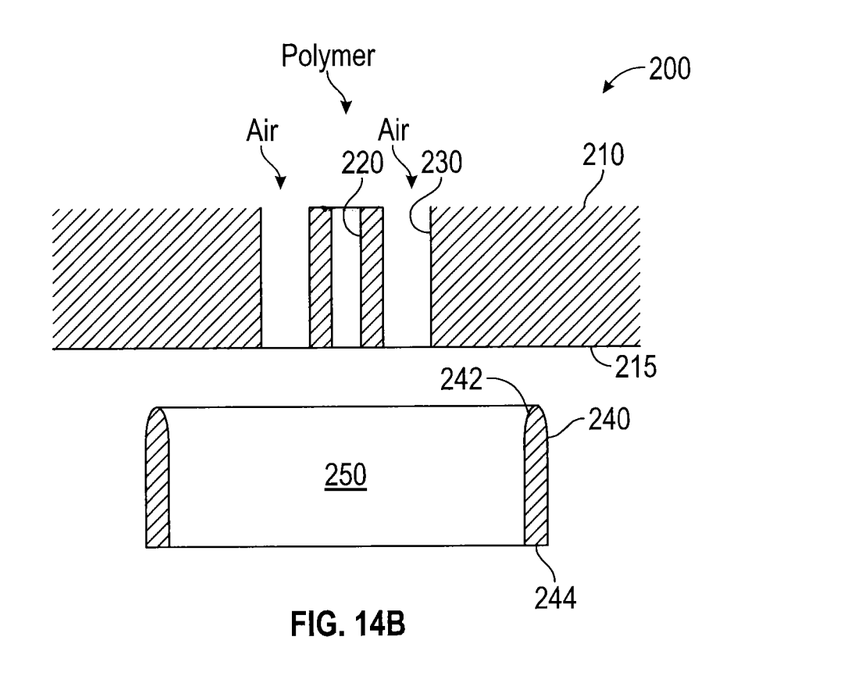
FIG. 14B is a sectional view taken along line A-A of FIG. 14A.

The melt blowing process is driven by a high velocity airfield which flows through the air slots 20 and 22. In conventional melt blowing systems there is a rapid decay of the air velocity field and temperature field below a melt blowing die. In the embodiments of the presently disclosed inventive concepts, this decay is reduced by the presence of louvers or airfoils positioned below the die 12, resulting in less air being needed to fabricate the fibers produced from the polymers. In FIG. 1 the louvers or airfoils are represented by general reference numerals 24 and 26. The louvers 24 and 26 function to physically prevent spreading of air in the space 28 below the nosepiece 14. Without spreading (and ambient air entrainment), the air field velocity does not decay in the controlled space 28 between the louvers 24 and 26. In an alternate embodiment, the melt blowing die may have a configuration wherein the nosepiece comprises a plurality of polymer apertures, each of which has an individualized air slot encompassing the aperture. Typically, the air slots in such an embodiment have circular shapes about the apertures (e.g., see FIG. 14 described below). A common form of this configuration is know as a "Schwarz die" (see U.S. Pat. Nos. 4,380,570 and 5,476,616).

Experimental Equipment and Procedures

A schematic of a basic melt blowing die similar to that shown in Tate and Shambaugh (1998) was equipped with a pair of louvers in accordance with the presently disclosed inventive concepts as shown in FIGS. 1 and 2. The embodiments of the melt blowing systems of the presently disclosed inventive concepts are not intended to be limited to the specific parameter values described for the various examples described herein.

The coordinate system for the experiments is shown in FIGS. 1 and 2. The origin is at the center of an exposed face 30 of the die 12. The z direction is vertical, and the x direction is parallel to the face 30 of the die. Perpendicular to the plane of FIG. 1 is the y direction (not shown). In the examples of FIGS. 6-13, the air flow rate, at standard conditions of 21° C. and 1 atmosphere pressure, was maintained at either $1.25 \times 10^{-3}$ or $1.67 \times 10^{-3}$ m$^3$/s (75 or 100 liters/min). The die had a horizontal gap spacing ("b" in Tate and Shambaugh, 1998) equal to 0.75 mm, and a slot length ("l" in Tate and Shambaugh) of 50 mm. The air velocity was measured with a Pitot tube that had an outer diameter of 0.71 mm, an inner diameter of 0.45 mm, a length of 6.35 cm, and a conical nose with a cone angle of 25°. The pressure in the Pitot tube was measured with a digital pressure gauge. The pressure was referenced to ambient static pressure, and the tube was oriented vertically during the measurements. The Pitot tube was positioned with a Velmex® three-dimensional traverse system that permitted x, y, and z motions in 0.01 mm increments.

Two louvers (such as louvers 24 and 26 of FIG. 1, or other louver shapes described elsewhere herein, e.g., in FIGS. 3-5) were placed in the flow field below the melt-blowing die 12. The length of the louvers 24 and 26 (in the direction perpendicular to the plane of FIG. 1) was 76.2 mm (3 inches), and this length was centered such that the louvers 24 and 26 completely covered the length of the two air slots 20 and 22 (50 mm). For a commercial melt-blowing die, where f might be on the order of 1 meter, the louver length could be somewhat larger than 1 meter to enable the louvers to completely control the flow field over the entire length of an air slot. The louvers can be fabricated from any suitable rigid material which can withstand the conditions below the melt-blowing die, including, but not limited to metal, thermoplastics, or other polymers, or composites, wood, glass, and ceramics.

The louvers used in the present study had a height of 2 cm and were placed between z=2 and z=4 cm. The louvers 24 and 26 in FIG. 1 have rectangular cross sections, but due to turbulence and high drag coefficient of bluff bodies, the shapes of the louvers may have curved portions. For example, airfoil-shaped louvers can be, and were, used instead in the present work. Specifically, a louver 24a shown in FIG. 3A was used. In the terminology of airfoil design this shape has an overall thickness "e" of 1.588 mm (1/16 of an inch) and a chord width "c" of 20 mm. The airfoil shape in this case is symmetric (the top and bottom are mirror images of each other), has a half-circle leading edge, and has a trailing edge that is a simple wedge. Of course, other much more complicated airfoil designs can be used (for example see Abbott and von Doenhoff, 1959).

Figure 3A:
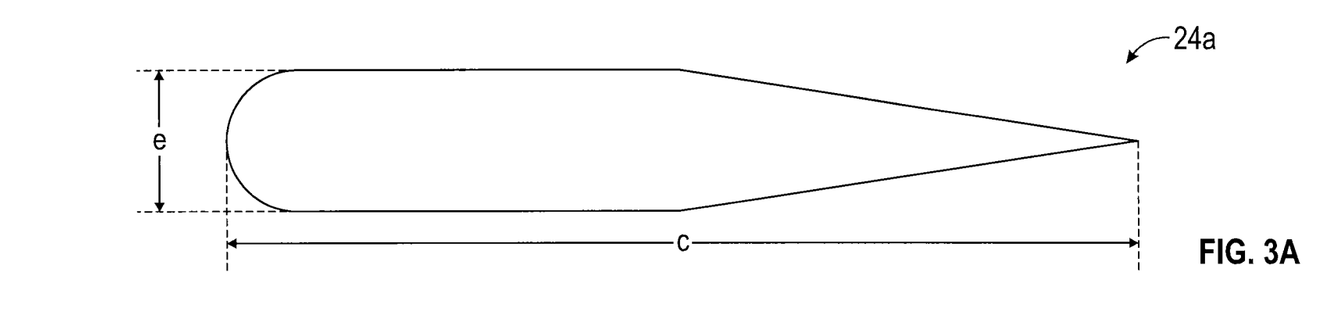
FIG. 3A depicts a cross-sectional view of a louver configured to have an airfoil shape.
Figure 3B:
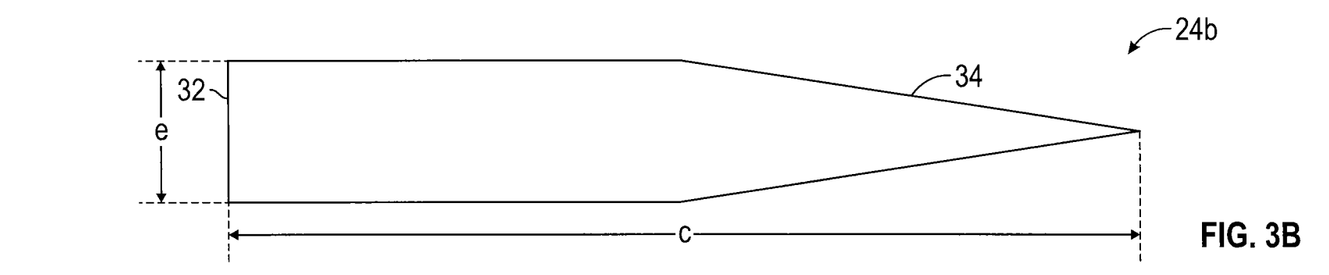
FIG. 3B depicts a cross-sectional view of a louver configured to have a flat leading edge and an airfoil shaped trailing edge.

FIG. 3B illustrates another embodiment of a louver 24b with a flat leading edge 32 and a trailing edge 34. For the case where a louver is placed flush against the die face (i.e., with $z_1=0$), there would be less need to have a rounded leading edge for the louver. This is because, for a flush louver, the louver does not divide the airflow. A simple flat, rectangular front edge of the louver is a possible shape for a flush louver. Likewise, while the trailing edge 34 of the louver 24b is shown to be tapered, the trailing edge could formed in a variety of shapes, such as flat like the flat leading edge 32.

Figure 4:
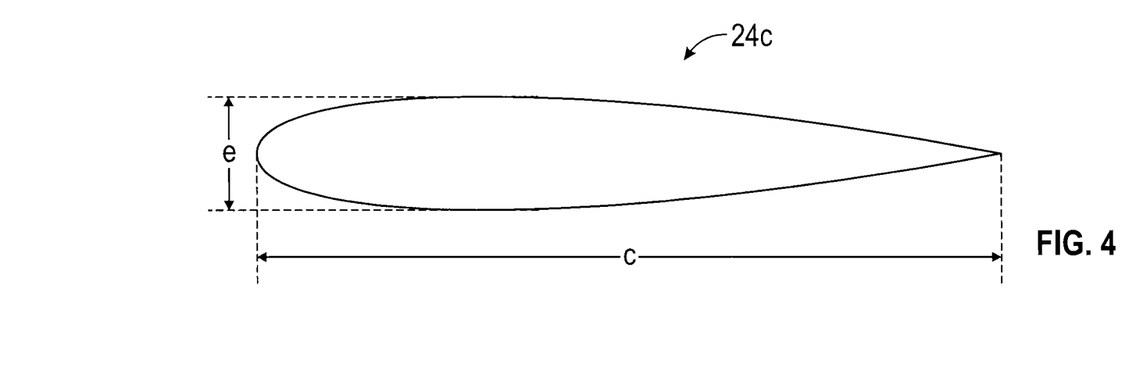
FIG. 4 depicts a cross-sectional view of a louver configured to have a NACA 0016 airfoil shape.

The shape of the louver used herein can have a shape of a specific NACA airfoil shape (Abbott and von Doenhoff, 1959). FIG. 4 shows an example of a louver 24c of the presently disclosed inventive concepts having a shape of a NACA 0016 airfoil. This airfoil has a width to chord ratio of 16%. In a NACA 0008 airfoil, the width to chord ratio would be 8%. Thus, an NACA 0008 airfoil with a chord of 20 mm would have the same overall dimensions as the airfoil used in our experiments (e.g., see FIG. 3A), but the NACA 0008 airfoil would be aerodynamically superior to the airfoil shown in FIG. 3A. Other airfoil configurations such as the 5 digit NACA series and non-NACA designs can also be used.

Figure 5:
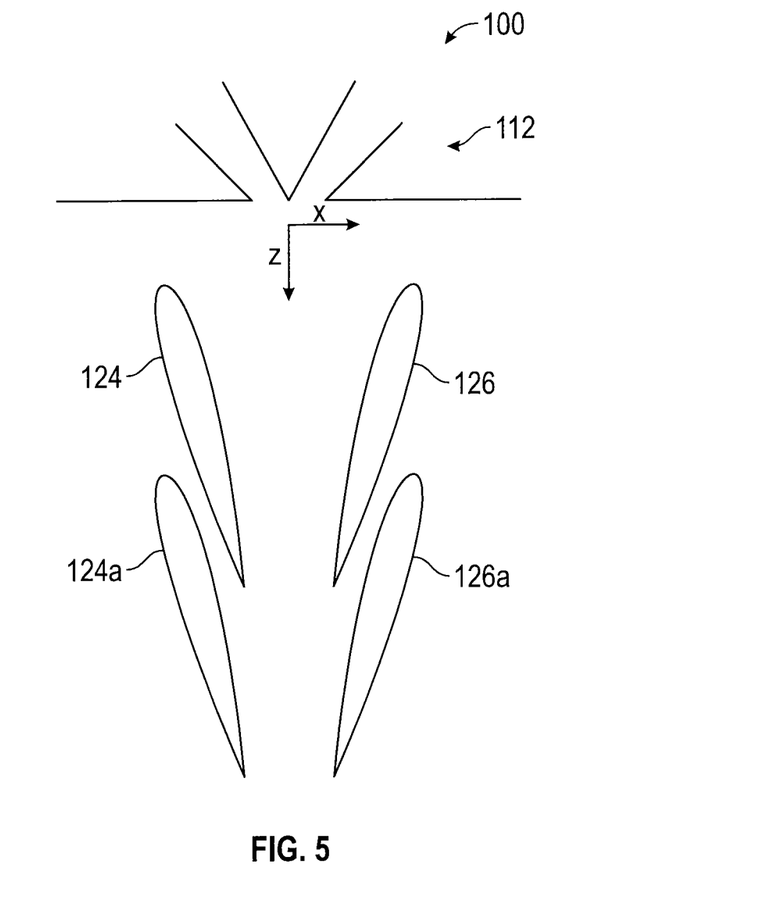
FIG. 5 depicts a cross-sectional schematic view of a melt blowing apparatus with four louvers, staggered in pairs below a melt blowing die, the louvers at an angle to direction Z.

Furthermore, more than two louvers may be used. For example, four louvers can be arranged with two louvers on each side of the air discharge. Each side could have the louvers at the same z level and same angle α, or the louvers on each side could be staggered at different z levels and/or have different α angles (note that α can be negative). Another arrangement is to have a flush louver (with $z_1=0$) and another louver (with $z_1$ greater than 0) on the left side of the die centerline (the centerline is where x=0) and a mirror-image arrangement of two more louvers on the right side of the die centerline. A subset of this arrangement might have the flush louvers farther from the centerline ("outboard") relative to the other two louvers. In another possible arrangement, the louvers need not be perpendicular in the y direction, and the louvers need not have the same cross-sectional shape as a function of the y direction. FIG. 5 shows a non-limiting embodiment of a melt blowing apparatus 100 with a melt blowing die 112 and four of airfoil louvers 124, 126, 124a, and 126a, which are staggered and angled in relation to direction z. The airfoil louvers 124, 126, 124a, and 126a are shown to have a shape similar to the shape of the louver 24b shown in FIG. 4, but may have any other shaped described or contemplated herein.

If a melt blowing die nosepiece has more than one row of polymer orifices (apertures), the arrangement of louvers and number of louvers could be widely varied. For example, with two parallel rows of polymer orifices (instead of one as in the present examples), in addition to the two basic louvers, a third, central, louver could be positioned below the nosepiece along a centerline of the die between the two rows of polymer orifices. Or, we could use more than three louvers with the two rows of orifices. The z positions and a angles for these louvers could vary over wide ranges. With polymer orifices in arrays or circular patterns (see U.S. Pat. No. 4,380,570), the louvers could be arranged in curvilinear patterns relative to a z plane, or relative to three-space. The louvers are not limited to having an airfoil shape or rectangular cross-section (rectangular cross sections are shown in FIGS. 1 and 2). In certain embodiments, the louvers can have sharp knife edges (wedge edges) on the leading edge only, the trailing edge only, or on both edges. For thin louvers, the drag of these knife edges would be quite small. In certain embodiments, the louvers can have a curved shape (for example, totally round or circular, or partially round, in cross section—for example see FIG. 14 described below). The melt blow apparatus could be constructed to have a plurality (e.g., two or more, or even dozens) of such curved (e.g., round) louvers placed below the die to control the airfield. For round or curved louvers with small diameters, the louvers could be arranged in patterns that would approximate the larger louvers shown in FIGS. 1 and 2 (akin to "pixelated" large louvers). The use of asymmetric airfoils is also possible (e.g., see Abbott and von Doenhoff, 1959). For example, two airfoil louvers could be placed such that the upper surfaces of the airfoils face inwardly towards the die centerline (see FIG. 1). Or, the upper surfaces could both face outward, away from the die centerline. Or, the upper surfaces could both be in same direction (e.g., both facing left or both facing right). The presently disclosed inventive concepts also include embodiments in which both symmetric and asymmetric louvers are used, or different shapes of louvers are used together.

It is also possible to have "active" or "dynamic" airfoils that, rather than being fixed below the die, can vibrate or move in order to enhance the melt blowing process. Other embodiments include the use of secondary air injection (air other than the primary melt blowing air) along with the presence of the louvers. This air could be emitted from separate nozzles or jets, or the air could in some way be emitted from the louvers themselves.

As noted above, the louvers can be fabricated from metal, ceramic, wood, synthetic polymers, composites, glass, or any other material than can withstand the temperature conditions near a melt blowing nozzle. Materials with insulating value could help maintain the air temperature in the space sheltered by louvers. However, heat conductive louvers can be used in other embodiments of melt blowing operations. Louvers might also be heated to help control the temperature and properties of the polymer fiber. In other cases, louvers could be cooled to improve the melt blowing process. (For example, cooling might be used to increase crystallinity in melt blown fibers.) Louvers could be heated by electrical wires, by liquid flowing through or over the louvers, by phase change of fluids within (or on the outside) of the louvers, Joule-Thomson effect, or by any other means effective in heating the louvers. Louvers could be cooled by a thermoelectric cooler, Joule-Thomson effect, liquid flowing through or over the louvers, phase change of fluids within (or on the outside) of the louvers, or other means.

In addition to reducing the amount of air needed to produce a given quantity of nonwoven fiber, louvers can be used to control and improve the laydown pattern of the nonwoven fibers upon the collection device (e.g., a flat screen or drum).

I. Results—Air Velocity Experiments without Actual Melt Blowing

The data given in Part 1 (Examples related to results of FIGS. 6-13) are for air velocity measurements with various louver configurations, without thermoplastic polymer being passed through the nosepiece.

Figure 6:
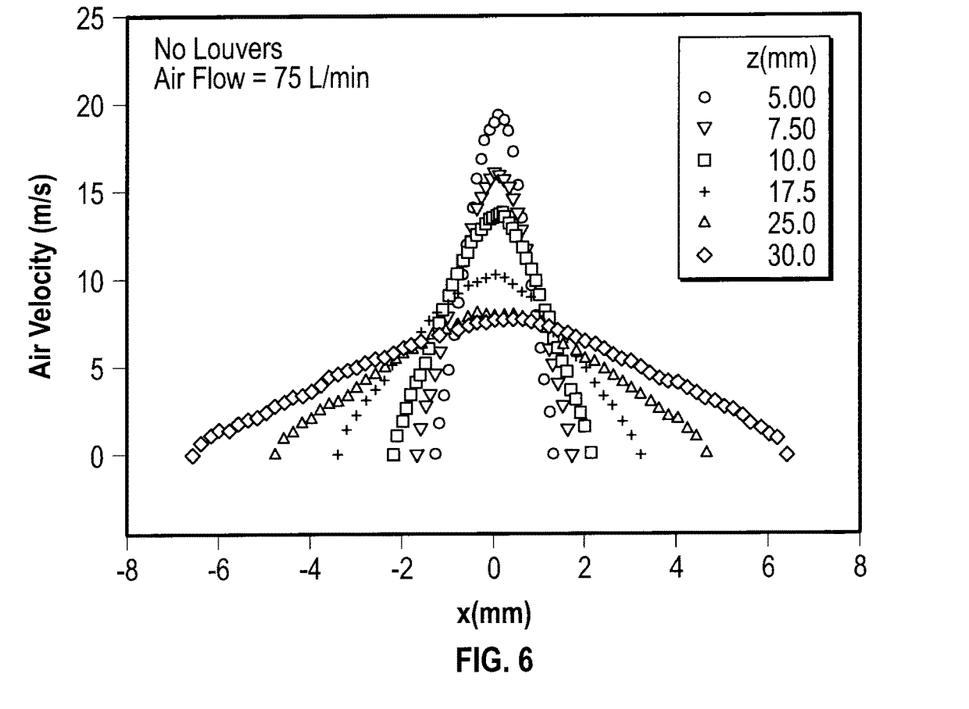
FIG. 6 is a graphical representation of the air velocity profile below the melt blowing die when no louvers are present.

For the case of a conventional melt blowing die where no louvers are present, FIG. 6 shows the air velocity distribution below the melt blowing die. Velocity profiles are given for z positions ranging from 5 to 30 mm below the die. Near the die, the profiles are quite sharp, but the profiles get flatter and more spread out as the distance from the die increases. For positions that are away from the die, significant amounts of ambient air are entrained into the air jet. The profiles shown in FIG. 6 are typical for melt blowing dies (see Tate and Shambaugh, 1998).

Figure 7:
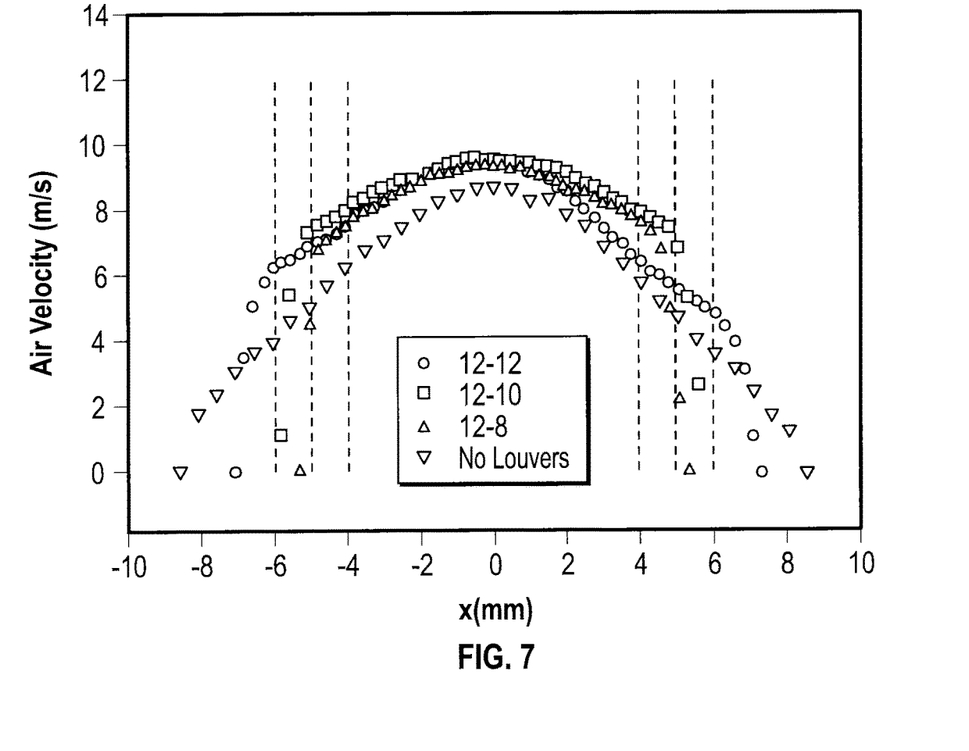
FIG. 7 is a graphical representation of the air velocity profile below louvers with $f_1$=12 mm.

FIG. 7 shows air velocities when louvers are present. Two louvers were placed below the melt blowing die in the angled manner shown in FIG. 2. Each of these louvers had an airfoil shape as shown in FIG. 3A. All velocity profiles were taken with $f_1$=12 mm. Profiles are shown for $f_2$=12, 10, and 8 mm. For comparison, a "no louver" profile is also shown. The airflow rate was 100 L/min. The airfoil louvers had their leading edges at z=20 mm ($z_1$=20 mm), and the velocity measurements were taken at the trailing edge of the louvers (at z=40 mm). Taking the velocity measurements at this trailing position shows definitively whether the presence of the louvers has prevented decay in the air velocity within (between) the louvers. From continuity (and for when $f_1$=$f_2$), the average velocity between the trailing edges is equal to the average velocity in the zone between the louvers (from z=20 mm to z=40 mm). Thus, the louvers cause a plateau in the air velocity.

For the positioning of the airfoils (FIG. 3A), values of $f_1$ and $f_2$ were based on measurements for a rectangular approximation of the airfoil shape. Specifically, the $f_1$ and $f_2$ values were set based on a rectangular louver with a thickness of 1.588 mm and a chord width of 20 mm (i.e., the overall dimensions of the airfoil shown in FIG. 3A). Because of the rounding of the leading edges of the airfoils, the actual distance between the tops of the airfoil pair is slightly greater than $f_1$. Likewise, because of the tapering of the trailing edges of the airfoils, the actual spacing between the trailing edges is slightly greater than $f_2$.

For the various velocity profiles in FIG. 7, the values of $f_1$ and $f_2$ are indicated in the legend as "$f_1$–$f_2$". Thus, "12–10" represents $f_1$=12 mm and $f_2$=10 mm. FIG. 5 shows that, for "12–12" (when the louvers are parallel and vertical with $f_1$=$f_2$), the centerline (x=0) air velocity is 9.53 m/s. This is about a 10 percent higher than the 8.67 m/s velocity in the case when no louvers are present. So, the presence of louvers is significant. For 12–10 and 12–8 (when $f_2$=10 mm and $f_2$=8 mm), the centerline velocities are essentially the same as for 12–12. Ergo, when $f_1$=12 mm, angling the louvers has little effect on the centerline velocity (for the range of $f_2$ values considered).

Figure 8:
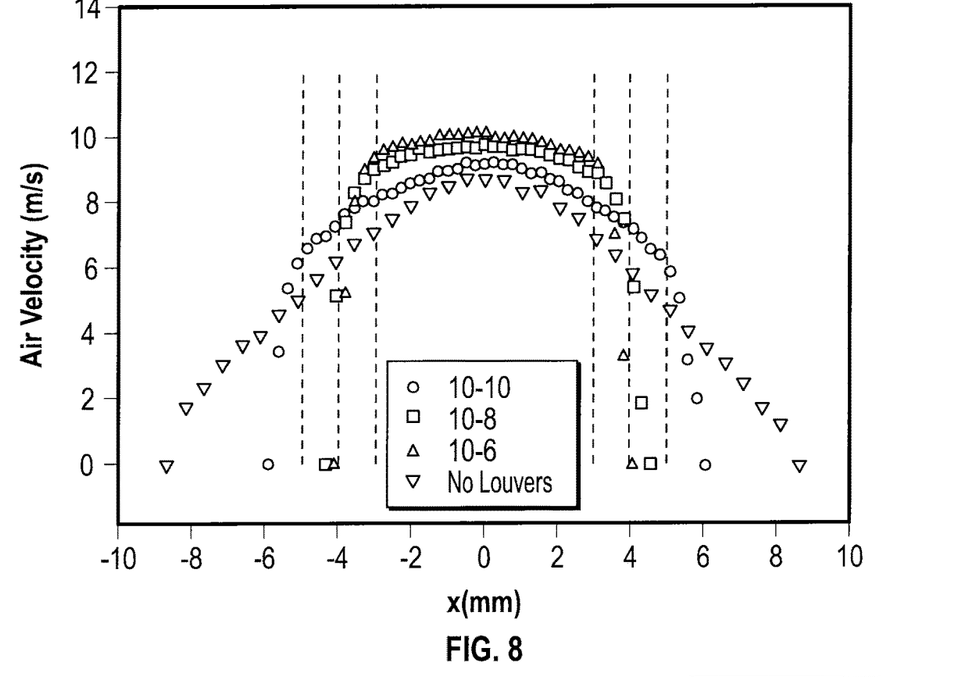
FIG. 8 is a graphical representation of the air velocity profile below louvers with $f_1$=10 mm.

FIG. 8 shows a family of profiles for when the louvers are closer together. For these profiles, $f_1$=10 mm, while $f_2$ is 10, 8, and 6 mm. For 10–10, 10–8, and 10–6, the centerline velocities are 9.12, 9.69, and 10.0 m/s, respectively. These compare with a velocity without louvers of 8.67 m/s. Unlike the situation in FIG. 5 (for $f_1=12$ mm), angling the louvers (decreasing $f_2$ relative to $f_1$) does increase the velocity.

Figure 9:
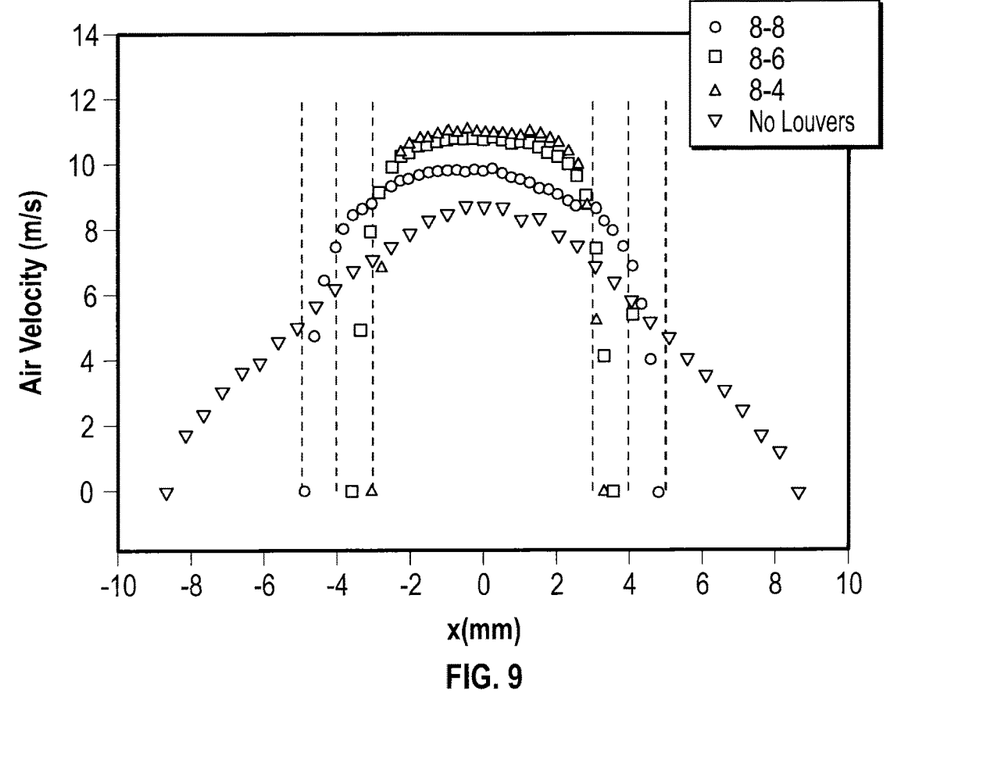
FIG. 9 is a graphical representation of the air velocity profile below louvers with $f_1$=8 mm.

FIG. 9 shows results for louvers that are placed even closer together (with $f_1=8$ mm). For 8-8, 8-6, and 8-4, the centerline velocities are 9.81, 10.8, and 11.0 m/s, respectively. The velocity without louvers is 8.67 m/s. As with the situation for $f_1=10$ mm (as shown in FIG. 8), angling the louvers causes further increases in velocity. Also, the centerline velocities (for all $f_2$ values) are higher for $f_1=8$ mm than for $f_1=10$ or $f_1=12$ mm.

Figure 10:
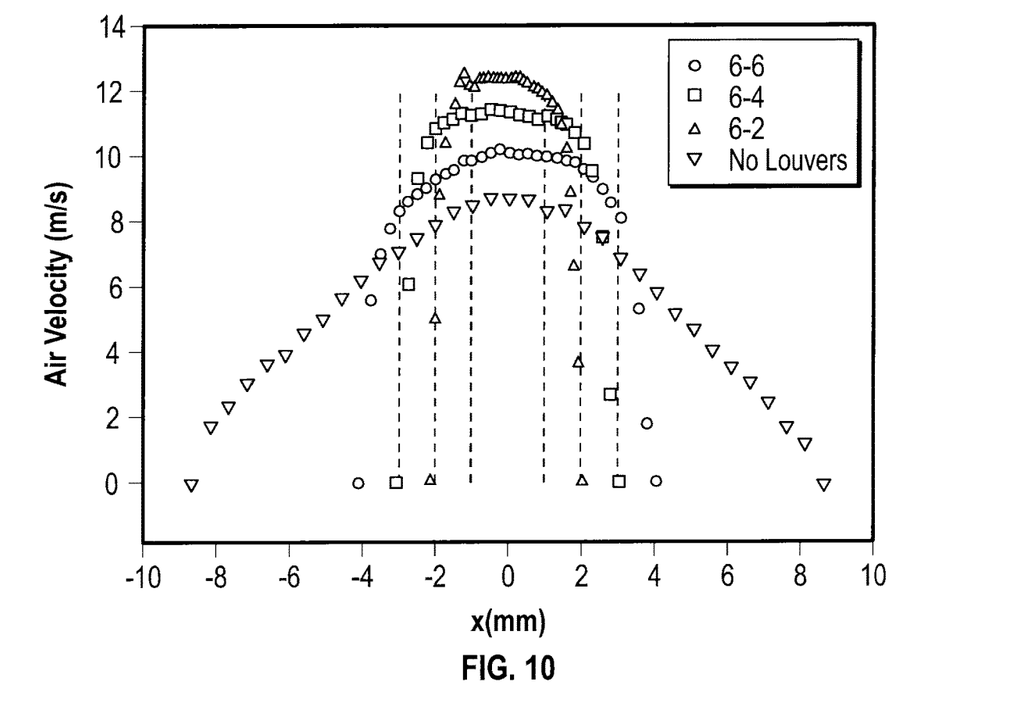
FIG. 10 is a graphical representation of the air velocity profile below louvers with $f_1$=6 mm.

FIG. 10 shows the effects of a further decrease of $f_1$ to 6 mm. For 6-6, 6-4, and 6-2, the centerline velocities are 10.0, 11.3, and 12.3 m/s, respectively. These compare with a velocity of 8.67 m/s without louvers. Again, overall velocities are higher than for conditions where $f_1$ is larger (see FIGS. 7 to 9). Also, angling the louvers causes further increases in velocity.

Figure 11:
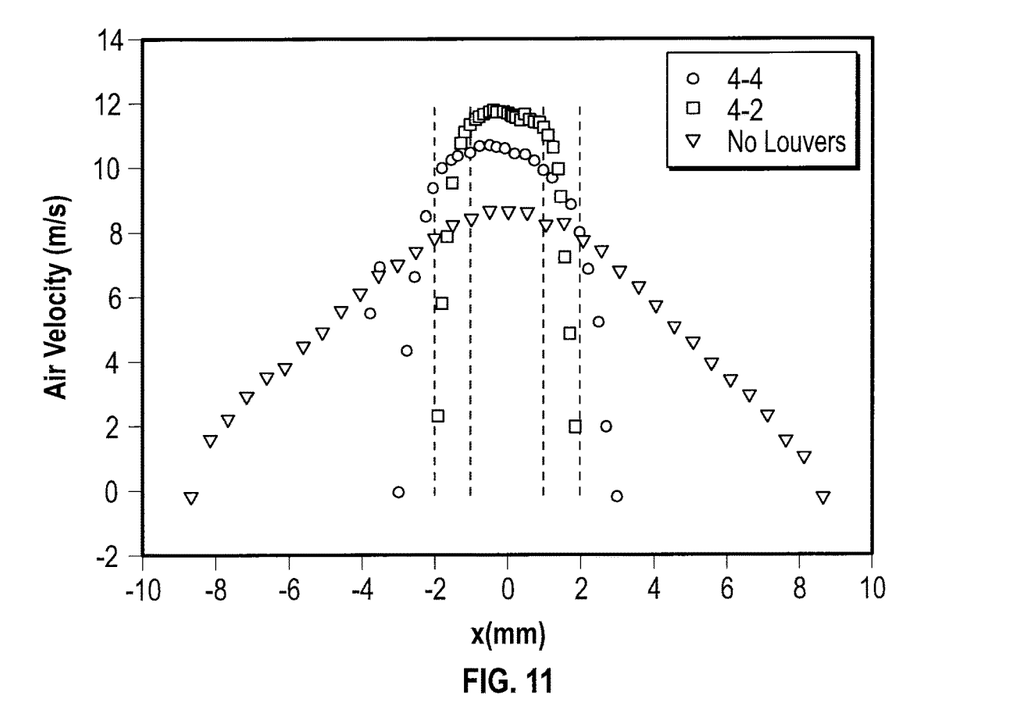
FIG. 11 is a graphical representation of the air velocity profile below louvers with $f_1$=4 mm.

FIG. 11 shows velocity profiles with the louver separation further decreased to $f_1=6$ mm. For 4-4 and 4-2 the centerline velocities are 10.6 m/s and 11.7 m/s, respectively. The velocity without louvers is 8.67 m/s. As observed previously, angling the louvers increases the velocity.

Figure 12:
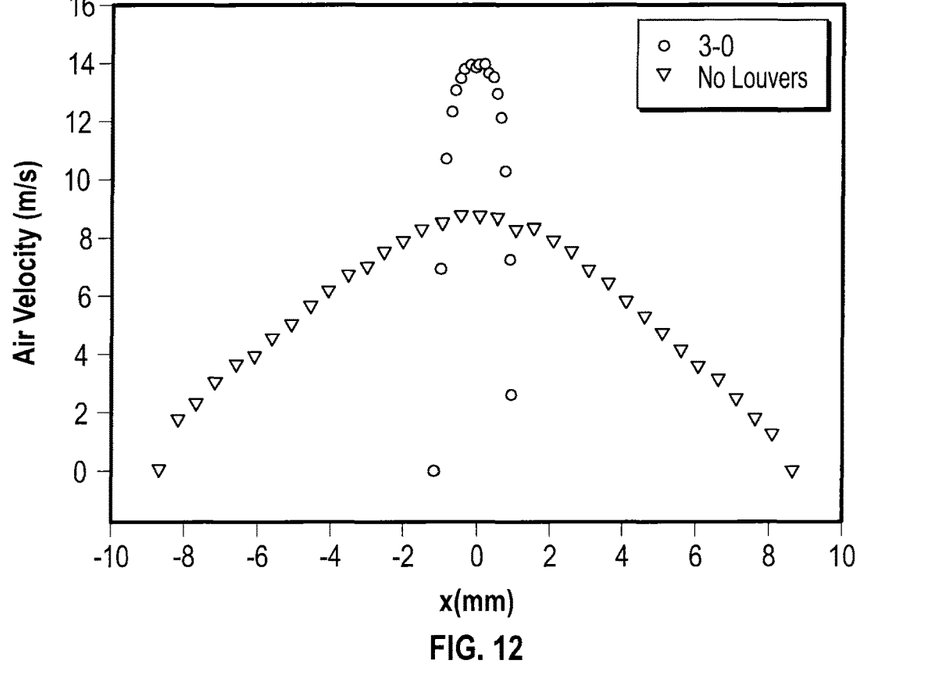
FIG. 12 is a graphical representation of the air velocity profile below louvers with $f_1$=3 mm.

FIG. 12 shows a velocity profile for when the louvers are quite close together with $f_1=3$ mm and $f_2$ approaching 0 mm. (As explained above in the discussion of FIG. 7, $f_2=0$ mm does not mean that there is "zero distance" between the trailing edges of the louvers.) For 3-0, the velocity is 13.9 m/s. This velocity is 60% higher than the velocity of 8.67 m/s without louvers.

Figure 13:
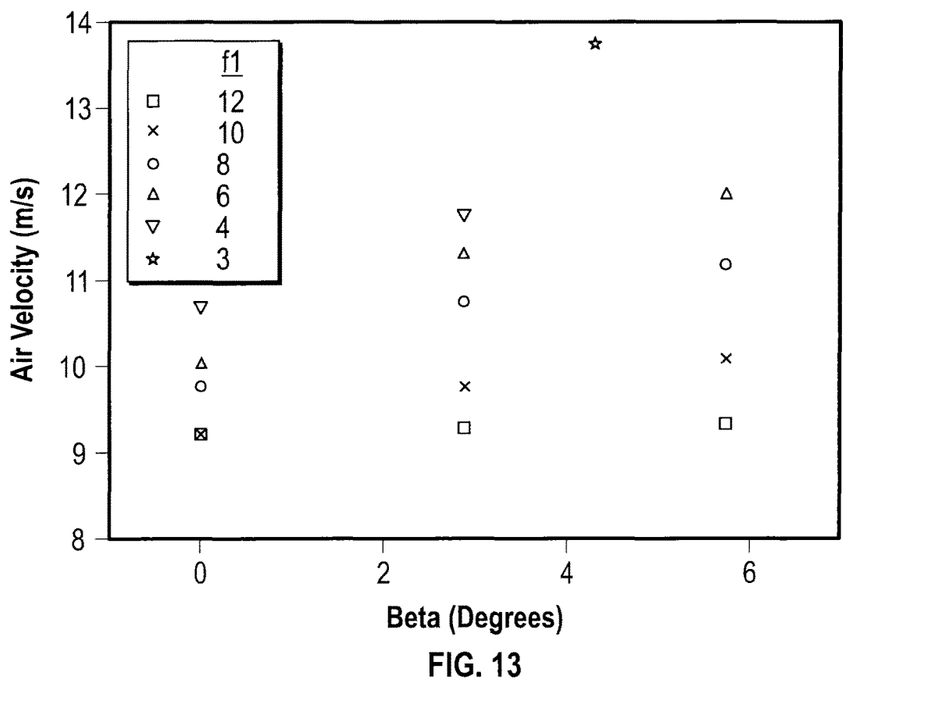
FIG. 13 is a graphical representation of the peak air velocity as a function of $f_1$ and Beta (β). When Beta=0, $f_2$=$f_1$. When Beta>0, $f_2$<$f_1$. The airflow rate was 100 liters/min.

FIG. 13 shows the effect of louver angle β on the centerline velocity. As noted above, β is the complement of the angle α (i.e., β=90−α, see FIG. 2). Vertical ($f_1=f_2$) louvers correspond to β=0. FIG. 13 shows that, as the louvers are moved closer together (when $f_1$ is decreased), the effect of increasing β becomes more pronounced.

These results lead to several conclusions including but not limited to:

(1) The air flow field below a melt blowing die can be modified by placing louvers in the airfield.
(2) These louvers can maintain the centerline air velocity at higher values than for melt blowing without louvers. For the configurations tested in the experiments, the centerline air velocity at the trailing edge of the louvers was as much as 60% higher than when no louvers were present. (3) Higher centerline velocities mean that less air is needed to melt blow a given amount of nonwoven fiber.
(3) Due to the requirements of large amounts of air used in melt blowing, and the high costs associated with compressing, heating, and recycling this air, the economic value of decreasing these costs using the presently disclosed inventive concepts is significant.

2. Results—Air Velocity Experiments with Actual Melt Blowing

The data given below in Part 2 are for air velocity measurements with various louver configurations during actual melt-blowing, i.e., with thermoplastic polymer being passed through the nosepiece.

A Brabender extruder of 19.1 mm (0.75 in.) diameter and 381 mm length was used to melt and pressurize the polymer. The extruder had a 20:1 L/D ratio and a 3:1 compression ratio. The polymer exiting from the extruder was then fed to a modified Zenith pump that pumped controlled quantities of molten polymer through a single-hole melt blowing die. The polymer capillary had an inside diameter of 0.420 mm. The two air slots were set flush with the nosepiece, and the slot widths were 0.65 mm. Each slot had a length of 74.6 mm (2.94 in.). The cone angle of the nosepiece (see FIG. 1) was 60 degrees. The die assembly was heated with two 250 W cartridge heaters. The polymer used was 88 MFR Fina Dypro® isotactic polypropylene. This polymer had an $M_w$ of 165 000 and an $M_n$ of 41 500. The melt blowing die was installed vertically such that the fibers traveled downward to the collection screen below the die. Fibers were collected on an aluminum screen. Fiber diameters were measured offline with a Nikon optical microscope with a micrometer eyepiece.

A louver support bracket was installed below the melt blowing die. This bracket allowed the louvers to be quickly inserted into or removed from position below the die. The louvers were constructed of aluminum and had the same cross-section as shown in FIG. 3A. The louvers were positioned with $z_1=20$ mm, $z_2=40$ mm, and $f_1=f_2=8$ mm. For all runs, the two extruder zones were kept at 215° C., while the spin pack temperature was kept at 230° C. Results are shown in Table 1, which are understood to be only exemplary and not limiting.

TABLE 1

Melt blowing with and without louvers

| Run | Die Temp. (° C.) | Polymer Rate (g/min) | Gas Rate (liters/min) | Fiber Diameter Without Louvers (microns) | Fiber Diameter With Louvers (microns) |
|---|---|---|---|---|---|
| 1 | 220 | 0.40 | 80 | 59.3 | 40.0 |
| 2 | 231 | 0.40 | 80 | 53.5 | 41.6 |
| 3 | 231 | 0.40 | 60 | 127.8 | 102.6 |
| 4 | 231 | 0.12 | 60 | 62.2 | 45.5 |

As can be seen by examining the last two columns of Table 1, the presence of louvers significantly reduces the diameter of fibers collected on a screen below the melt-blowing die. Table 1 also shows that, as expected for melt blowing, finer fibers result from higher gas flow rates, lower polymer flow rates, and higher polymer temperature. The ranges of the melt blowing parameters shown in Table 1 or elsewhere herein are not intended to be limiting as to the possible range of parameters that can be used in the embodiments of the presently disclosed inventive concepts. Indeed, the values of the melt blowing parameters shown in Table 1 or elsewhere herein represent only a small subset of possible parameter ranges. The advantages of using louvers extend to other such parameter values and ranges. By ranges is meant both input parameters (such as but not limited to gas flow rate, polymer flowrate, polymer temperature and air temperature) and output parameters (such as but not limited to fiber diameter and polymer crystallinity). So, for example, some industrial situations might require fibers of smaller diameter than those shown in Table 1.

As noted above, in certain embodiments, the melt blowing die system is constructed to have a curved or ring shaped die below the melt blowing die, particularly in the case when the die is a Schwarz type melt blowing die with a plurality of polymer orifices (apertures, each surrounded by an annular (ring-shaped) air slot. FIGS. 14A and 14B show one non-limiting embodiment of such a configuration. FIGS. 14A and 14B depict an alternate melt blowing die system constructed in accordance with the presently disclosed inventive concepts. FIG. 14A shows a bottom plan view of a melt blowing die system 200 having a melt blowing die 210 with a die head face 215, a polymer orifice 220 and an annular air slot 230 which surrounds the polymer orifice 220. A circular (ring) louver 240 is positioned below or adjacent the die head face 215 in a location such that melted polymer fibers extruded from the polymer orifice 220 will pass through a zone 250 of the circular louver 240 as shown in FIG. 14B, which is a cross-sectional view taken through line A-A of FIG. 14A. While the circular louver 240 is shown as having a rounded leading edge 242 and a blunt trailing edge 244, it is intended that the leading and trailing edges 242 and 244 of the circular louver 240 can be constructed to have any shape or configuration described elsewhere herein or which enables the circular louver 240 to function in accordance with the presently disclosed inventive concepts. For example the circular louver 240 could be constructed to have an airfoil shape.

It will be understood from the foregoing description that various modifications and changes may be made in the various embodiments of the present disclosure without departing from their true spirit. The description provided herein is intended for purposes of illustration only and is not intended to be construed in a limiting sense. Thus, while the presently disclosed inventive concepts have been described herein in connection with certain embodiments so that aspects thereof may be more fully understood and appreciated, it is not intended that the presently disclosed inventive concepts be limited to these particular embodiments. On the contrary, it is intended that all alternatives, modifications and equivalents are included within the scope of the presently disclosed inventive concepts as defined herein. Thus the examples described above, which include particular embodiments, will serve to illustrate the practice of the presently disclosed inventive concepts, it being understood that the particulars shown are by way of example and for purposes of illustrative discussion of particular embodiments of the presently disclosed inventive concepts only and are presented in the cause of providing what is believed to be a useful and readily understood description of procedures as well as of the principles and conceptual aspects of the inventive concepts. Changes may be made in the devices and methods described herein without departing from the spirit and scope of the presently disclosed inventive concepts. The claims listed herein are not intended to limit the claims which may be filed in subsequent applications which claim priority to the present application.

REFERENCES

Abbott, I. H., and von Doenhoff, A. E., *Theory of Wing Sections*, Dover Publications, 1959.

Bresee, R. R. and Ko, W. C., "Fiber Formation During Melt Blowing", *International Nonwovens Journal*, Summer 2003, p. 21.

Buntin, R. R.; Keller, J. P.; Harding, J. W., Nonwoven Mats by Melt Blowing. U.S. Pat. No. 3,849,241, Nov. 19, 1974.

Shambaugh, B. R., Papavassiliou, D. V., and Shambaugh, R. L., "Next-Generation Modeling of Melt Blowing", *Ind. Eng. Chem. Res.*, 2011, 50(21), 12233-12245

Shambaugh, B. R., Papavassiliou, D. V., and Shambaugh, R. L., "Modifying Air Fields to Improve Melt Blowing", *Ind. Eng. Chem. Res.*, 2012, 51, 3472-3483.

Shambaugh, R. L., "A Macroscopic View of the Melt Blowing Process for Producing Microfibers", *Ind. Eng. Chem. Res.*, 27, 2363, 1988.

Tate, B. D., and Shambaugh, R. L., "Modified Dual Rectangular Jets for Fiber Production", *Ind. Eng. Chem. Res.*, 1998, 37(9), 3772-3779.

Tate, B. D., and Shambaugh, R. L., "Temperature Fields below Melt Blowing Dies of Various Geometries", *Ind. Eng. Chem. Res.*, 2004, 43(17), 5405-5410.

Schwarz, E. C. A, "Apparatus and Process for Melt Blowing a FiberformingThermoplastic Polymer and Product Produced Thereby," U.S. Pat. No. 4,380,570 (Apr. 19, 1983).

What is claimed is:

1. A melt blowing apparatus, comprising:
a melt blowing die having at least one air plate with an exposed face and a nosepiece with at least one aperture from which molten filament is extruded, the nosepiece positioned adjacent the at least one air plate to form at least one air slot adjacent the aperture from which air is passed at a velocity to impact the molten filament; and
at least one louver having a rounded leading edge, a tapered trailing edge, and an upper surface and a lower surface extending between the leading edge and the trailing edge, the at least one louver positioned adjacent the exposed face of the at least one air plate with the rounded leading edge spaced from the exposed face so the rounded leading edge, the upper surface, and the lower surface are exposed to the air from the air slot and so the at least one louver forms a zone through which can pass the air and the molten filaments extruded from the aperture, the at least one louver movable to maintain the velocity of the air as the air and molten filaments pass through the zone absent the use of secondary air injection below the exposed face.

2. The melt blowing apparatus of claim 1, wherein the at least one louver is positioned at an angle to the exposed face of the at least one air plate.

3. The melt blowing apparatus of claim 1, comprising at least two louvers each having a rounded leading edge, a tapered trailing edge and an upper surface and a lower surface extending between the leading edge and the trailing edge, the at least two louvers positioned adjacent the exposed face of the at least one air plate with the rounded leading edges spaced from the exposed face so the rounded leading edges, the upper surfaces, and the lower surfaces are exposed to the air from the air slot and so the at least two louvers form a zone through which can pass the air and the molten filaments extruded from the aperture, the at least two louvers movable to maintain the velocity of the air as the air and molten filaments pass through the zone.

4. The melt blowing apparatus of claim 1, comprising at least three louvers each having a rounded leading edge, a tapered trailing edge and an upper surface and a lower surface extending between the leading edge and the trailing edge, the at least two louvers positioned adjacent the exposed face of the at least one air plate with the rounded leading edges spaced from the exposed face so the rounded leading edges, the upper surfaces, and the lower surfaces are exposed to the air from the air slot and so the at least two louvers form a zone through which can pass the air and the molten filaments extruded from the aperture, the at least three louvers movable to maintain the velocity of the air as the air and molten filaments pass through the zone.

5. The melt blowing apparatus of claim 1, wherein the at least one air slot has a linear configuration.

6. The melt blowing apparatus of claim 5, wherein the at least one air slot is formed between the linear air plate and the nosepiece.

7. The melt blowing apparatus of claim 1, wherein the zone through which can pass air and molten filaments is a channel, wherein the channel is from the exposed face of the at least one air plate to a leading edge of the at least one louver.

8. The melt blowing apparatus of claim 1, comprising:
at least two air slots and at least two air plates adjacent the nosepiece, wherein each of the at least two air slots is between one of said air plates and the nosepiece, and wherein the at least one louver is positioned to form a fiber spinning line, wherein air entrainment is blocked from only one side of the fiber spinning line.

9. The melt blowing apparatus of claim 8, wherein the at least one louver is angled at a non-90 degree angle to provide an enhanced shielding effect of the zone.

10. The melt blowing apparatus of claim 1, wherein the at least one air slot has a nonlinear configuration.

11. The melt blowing apparatus of claim 10, wherein the at least one air slot has a circular configuration.

12. The melt blowing apparatus of claim 10, wherein at least one air slot is concentric about at least one aperture.

13. The melt blowing apparatus of claim 10, wherein the at least one louver has a ring shape forming the zone through which can pass air and molten filaments, the at least one louver having an axis which is perpendicular to the exposed face of the at least one air plate.

\* \* \* \* \*

UNITED STATES PATENT AND TRADEMARK OFFICE
CERTIFICATE OF CORRECTION

PATENT NO.         : 11,313,052 B2
APPLICATION NO.    : 15/752787
DATED              : April 26, 2022
INVENTOR(S)        : Robert L. Shambaugh It is certified that error appears in the above-identified patent and that said Letters Patent is hereby corrected as shown below:

In the Specification

Column 7, Line 9: After "The z positions and" delete "a" and replace with --$\alpha$--

Signed and Sealed this
Twenty-eighth Day of June, 2022

Katherine Kelly Vidal
*Director of the United States Patent and Trademark Office*